United States Patent [19]
Nakamura

[11] Patent Number: 5,894,759
[45] Date of Patent: Apr. 20, 1999

[54] BICYCLE SHIFT CONTROL DEVICE HAVING SPACED APART OPERATING UNITS

[75] Inventor: Yasushi Nakamura, Itami, Japan

[73] Assignee: Shimano, Inc., Osaka, Japan

[21] Appl. No.: 08/846,562

[22] Filed: Apr. 29, 1997

[51] Int. Cl.$^6$ .......................... B62K 23/02; B62K 23/04
[52] U.S. Cl. ................... 74/473.13; 74/480 R; 74/489
[58] Field of Search ........................ 74/473.13, 473.14, 74/480 R, 489; 474/80, 81, 82

[56] References Cited

U.S. PATENT DOCUMENTS

| | | | |
|---|---|---|---|
| 3,453,899 | 7/1969 | Tarutani | 74/217 |
| 3,742,777 | 7/1973 | Mathauser | 74/242.3 |
| 4,245,522 | 1/1981 | Robinson | 74/489 X |
| 4,352,503 | 10/1982 | Cotter | 280/238 |
| 5,421,219 | 6/1995 | Tagawa et al. | 74/489 X |
| 5,443,134 | 8/1995 | Gajek et al. | 74/473.13 X |
| 5,569,104 | 10/1996 | Bellio et al. | 74/473.13 X |
| 5,676,020 | 10/1997 | Jordan et al. | 74/473.14 |

FOREIGN PATENT DOCUMENTS

| | | | |
|---|---|---|---|
| 0 120 571 A1 | 10/1984 | European Pat. Off. | B62M 25/08 |
| 2154018 | 5/1973 | France | B62M 25/00 |
| 2654698 | 5/1991 | France | 74/489 |
| 3938454 A1 | 5/1991 | Germany | B62M 25/08 |
| 19514267 A1 | 10/1996 | Germany | B62M 9/04 |
| 96/19376 | 6/1996 | WIPO | B62M 25/08 |

OTHER PUBLICATIONS

"Hydraulics & Pneumatics," Jul. 1982, p. 14.
European Search Report for EP 97306541.0, dated May 7, 1998.

*Primary Examiner*—Allan D. Herrmann
*Attorney, Agent, or Firm*—James A. Deland

[57] ABSTRACT

A bicycle shift control device includes a first downshift control device and a first upshift control device. The first downshift control device is spaced apart from the first upshift control device. When used with a handlebar having an intermediate handlebar stem attachment portion, the first downshift control device may be mounted on one side of the handlebar stem attachment portion, and the first upshift control device may be mounted on an opposite side of the handlebar stem attachment portion.

25 Claims, 6 Drawing Sheets

BICYCLE SHIFT CONTROL DEVICE HAVING SPACED APART OPERATING UNITS

BACKGROUND OF THE INVENTION

The present invention is directed to bicycle shift control devices and, more particularly, to a bicycle shift control device having spaced apart operating units such as shift levers, rotatable hand grips, etc.

Many types of bicycle shift control devices are used to control the operation of bicycle transmissions. One type of conventional bicycle shift control device includes a shift lever that is integrally formed with a winding drum. A control cable is connected to the winding drum is such that rotation of the shift lever in one direction causes the control cable to wind around the winding drum, thus pulling the control cable, and rotation of the shift lever in the opposite direction causes the control cable to unwind from the winding drum, thus releasing the control cable. The control cable is connected to a bicycle transmission, usually in the form of an internally mounted hub transmission or a derailleur, such that pulling the control cable causes the transmission to either upshift or downshift, and releasing the control cable causes the transmission to perform the opposite operation.

Another type of conventional bicycle shift control device includes a rotatable handgrip coaxially mounted around the handlebar axis. The handgrip is coupled to a control cable such that rotating the handgrip in one direction causes the bicycle transmission to either upshift or downshift, and rotating the handgrip in the opposite direction causes the bicycle transmission to perform the opposite operation.

Still another type of conventional bicycle shift control device includes separate levers mounted to a single shift lever housing. The levers are usually coupled to a ratchet mechanism such that rotating one lever causes the bicycle transmission to either upshift or downshift, and rotating the other lever causes the bicycle transmission to perform the opposite operation. The two levers are located in close proximity to each other so both levers can be rotated without moving the hand from the handlebar.

Since conventional shifting devices are constructed either from a single operating device or two operating devices located in close proximity to each other, both upshifting and downshifting are performed by the same hand, and the hand is usually located in substantially the same position for both operations. This may not be desirable for some riders.

SUMMARY OF THE INVENTION

The present invention is directed to a bicycle shift control device having spaced apart operating units. That is, the operating units are sufficiently spaced apart so that the rider must move his or her hand to two distinct positions along the longitudinal axis of the handlebar to upshift and downshift the transmission, or else the rider must use different hands for the upshift and downshift operations.

In one embodiment of the present invention, a bicycle shift control device includes a first downshift control device and a first upshift control device. The first downshift control device is spaced apart from the first upshift control device. For example, when used with a handlebar having an intermediate handlebar stem attachment portion, the first downshift control device may be mounted on one side of the handlebar stem attachment portion, and the first upshift control device may be mounted on an opposite side of the handlebar stem attachment portion. The control devices may be mounted on dedicated mounting members, or else they may be mounted on existing handlebar mounting structures such as brake lever brackets.

In a more specific embodiment, the first downshift control device may include a first downshift air valve having a first downshift air valve control member (such as a switch lever), and the first upshift control device may include a first upshift air valve having a first upshift air valve control member (such as a switch lever). Such a construction allows the downshifting and upshifting operations to be performed with a small movement of the finger, does not require removal of the rider's hand from the handlebar, and does not require any concentration by the rider. It is very easy for the rider to remember which operation is required for downshifting and which operation is required for upshifting.

If desired, a rotatable downshift control member may be operatively coupled to the downshift air valve so that rotation of the rotatable downshift control member operates the downshift air valve control member, and a rotatable upshift control member may be operatively coupled to the upshift air valve so that rotation of the rotatable upshift control member operates the upshift air valve control member. The rotatable control members may be of the type having an annular shape that can be mounted coaxially to the handlebar. Such a construction allows the derailleur to be operated with a very small twisting motion of the rotatable members. Alternatively, the first downshift control device may include a rotatable downshift control member coupled to a downshift control cable, and the first upshift control device may include a rotatable upshift control member coupled to an upshift control cable. The rotatable control members in this embodiment also may be of the type having an annular shape that can be mounted coaxially to the handlebar.

The number of separate upshifting and downshifting control members is not limited to two. For example, the shift control device may include a second downshift control device and a second upshift control device, wherein the second downshift control device is spaced apart from the second upshift control device. Such a shift control device may be useful with bicycle handlebars having a first handlebar extension extending from a first end of the handlebar and a second handlebar extension extending from a second end of the handlebar. In this case the second downshift control device may be mounted to the first handlebar extension, and the second upshift control device may be mounted to the second handlebar extension.

DETAILED DESCRIPTION OF THE EMBODIMENTS

Figure 1:
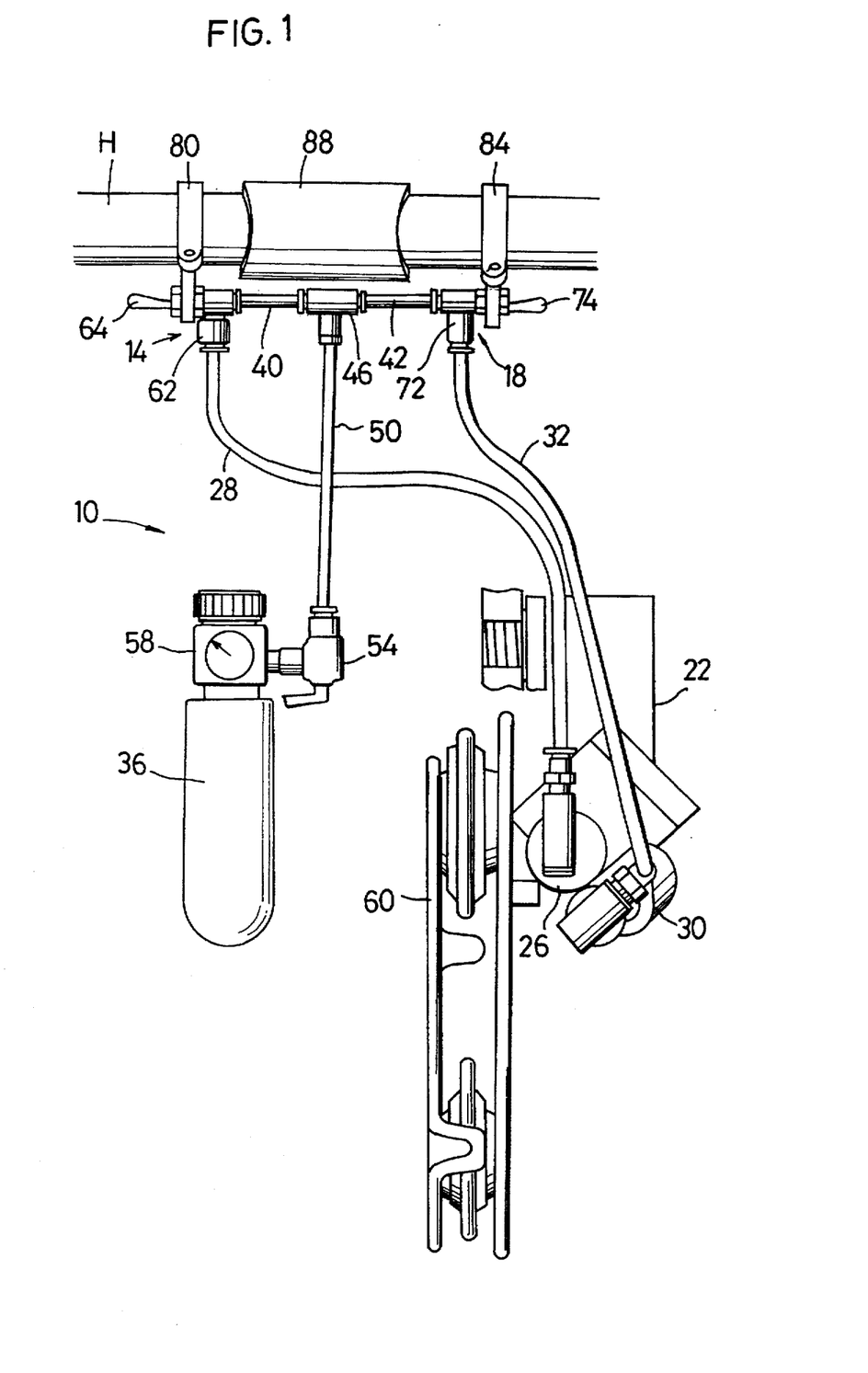
FIG. 1 shows a particular embodiment of a bicycle shift control device having spaced apart operating units according to the present invention.

FIG. 1 shows a particular embodiment of a bicycle shift control device 10 having spaced apart operating units 14 and 18 according to the present invention. Operating units 14 and 18 are used to control downshifting and upshifting of a gas actuated derailleur 22. In this embodiment, operating unit 14 functions as a downshift operating unit, and operating unit 18 functions as an upshift operating unit. Gas actuated derailleur 22 includes a downshift gas actuator 26 and an upshift gas actuator 30. Downshift gas actuator 26 is connected to downshift operating unit 14 through a gas conduit 28, and upshift gas actuator 30 is connected to upshift operating unit 18 through a gas conduit 32. Downshift operating unit 14 and upshift operating unit 18 are coupled to a compressed gas supply 36 through gas conduits 40 and 42, respectively, a distribution valve 46, a gas conduit 50, a supply valve 54, and a regulator 58. Gas actuated derailleur 22 and its associated components may be constructed in accordance with the teachings of my copending patent application entitled "Gas Actuated Derailleur," application Ser. No. 08/846,265 filed on Apr. 29, 1997 and incorporated herein by reference. In general, supplying gas pressure to downshift gas actuator 26 causes derailleur 22 to move a chain guide 60 in a downshifting direction by one gear at a time, and supplying gas pressure to upshift gas actuator 30 causes derailleur 22 to move chain guide 60 in an upshifting direction by one gear at a time.

In this embodiment, downshift operating unit 14 comprises an air valve 62 having an air valve control lever 64 that may be in the form of a toggle switch lever. Moving air valve control lever 64 away from the home position shown causes gas pressure to be applied to downshift gas actuator 26, and returning air valve control lever 64 to its home position removes gas pressure from downshift gas actuator 26. Each application/removal sequence causes derailleur 22 to move chain guide 60 in the downshifting direction by one gear. Similarly, upshift operating unit 18 comprises an air valve 72 having an air valve control lever 74, which also may be in the form of a toggle switch lever. Moving air valve control lever 74 away from the home position shown causes gas pressure to be applied to upshift gas actuator 30, and returning air valve control lever 74 to its home position removes gas pressure from upshift gas actuator 30. Each application/removal sequence causes derailleur 22 to move chain guide 60 in the upshifting direction by one gear.

As shown in FIG. 1, downshift operating unit 14 is mounted to a handlebar H through a mounting bracket 80, and upshift operating unit 18 is mounted to handlebar H through a mounting bracket 84. Handlebar H includes an intermediate handlebar stem mounting portion 88 which is usually located in the center of the handlebar for mounting the handlebar to a handlebar stem (not shown) which, in turn, is mounted to the bicycle front fork (not shown). Thus, as shown, downshift operating unit 14 is mounted on one side of handlebar stem mounting portion 88, and upshift operating unit 18 is mounted to the opposite side of handlebar stem mounting portion 88. In this embodiment, brackets 80 and 84 are completely separated from each other, but other embodiments may use a bridging member. However, downshift operating unit 14 should be sufficiently spaced apart from upshift operating unit 18 such that the rider cannot operate both operating units 14 and 18 with the same hand in the same position.

Figure 2:
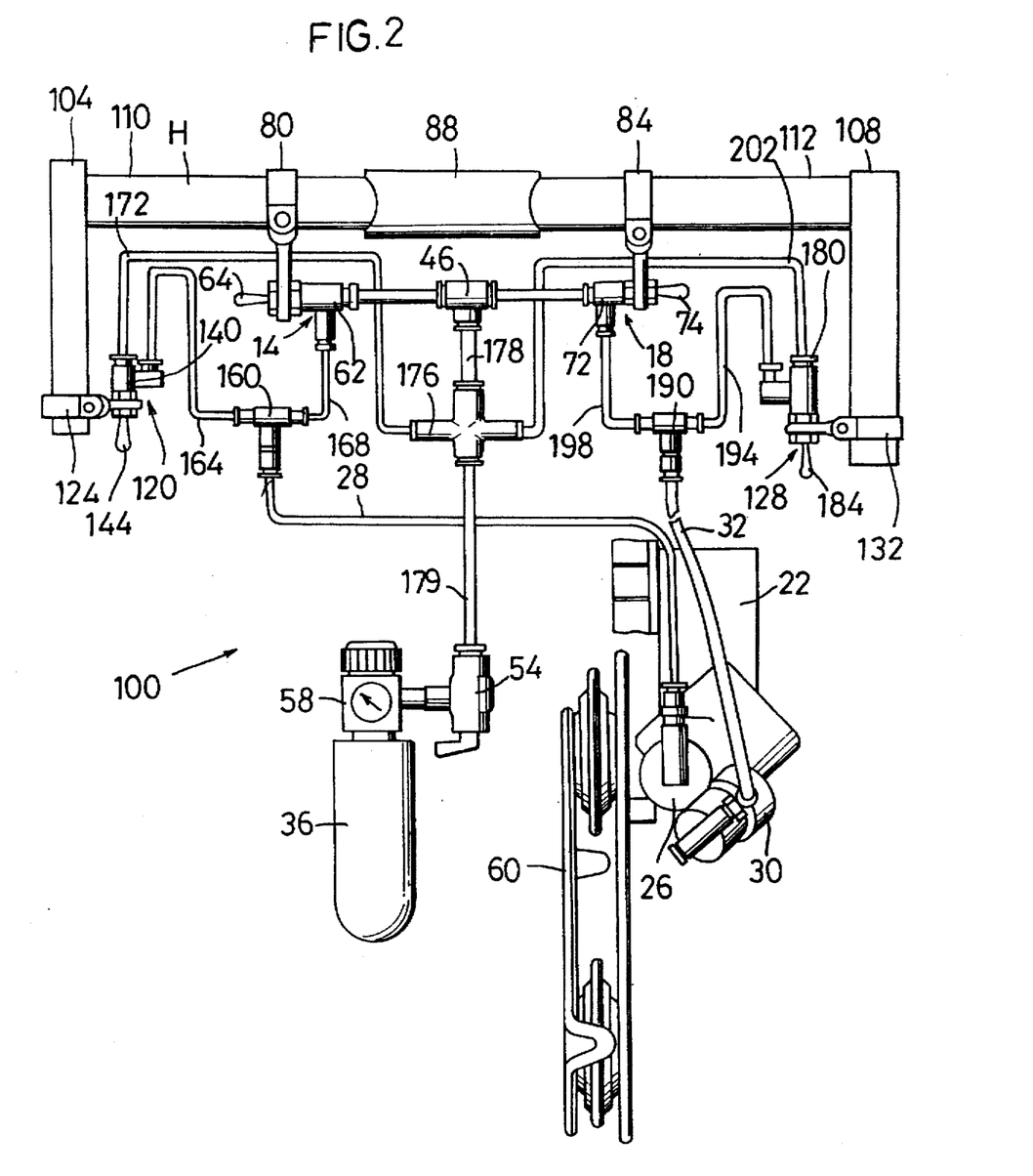
FIG. 2 shows an alternative embodiment of a bicycle shift control device having spaced apart operating units according to the present invention.

FIG. 2 shows an alternative embodiment of a bicycle shift control device 100 having spaced apart operating units according to the present invention. This embodiment uses many of the same components used in the embodiment shown in FIG. 1, so those components have the same reference numbers as in FIG. 1. In this embodiment, handlebar H includes handlebar extensions 104 and 108 that extend generally perpendicular to the respective ends 110 and 112 of handlebar H. In addition to downshift operating unit 14 and upshift operating unit 18, both mounted on handlebar H, a downshift operating unit 120 is mounted to the free end of handlebar extension 104 through a bracket 124, and an upshift operating unit 128 is mounted to the free end of handlebar extension 108 through a bracket 132. Placement of downshift operating units 14 and 120 and upshifting operating units 18 and 128 in this manner allows the rider to shift easily regardless of whether the rider's hand is located on handlebar H or handlebar extensions 104 or 108.

Downshift operating unit 120 comprises an air valve 140 having an air valve control lever 144. Downshift operating unit 120 is coupled to a shuttle valve 160 through a gas conduit 164, and shuttle valve 160 is coupled to gas conduit 28 leading to downshift gas actuator 26 on derailleur 22. Downshift operating unit 14 also is coupled to shuttle valve 160 through a gas conduit 168. Downshift operating unit 120 receives its supply of gas pressure from a gas conduit 172 that is connected to a distribution valve 176. Distribution valve 176 is connected between distribution valve 46 and supply valve 54 through gas conduits 178 and 179, respectively. As with downshift operating unit 14, moving air valve control lever 144 away from the home position shown causes gas pressure to be applied to downshift gas actuator 26, and returning air valve control lever 144 to its home position removes gas pressure from downshift gas actuator 26. Thus, each application/removal sequence from either downshift operating unit 14 or downshift operating unit 120 causes derailleur 22 to move chain guide 60 in the downshifting direction by one gear.

Upshift operating unit 128 comprises an air valve 180 having an air valve control lever 184. Upshift operating unit 128 is coupled to a shuttle valve 190 through a gas conduit 194, and shuttle valve 190 is coupled to gas conduit 32 leading to upshift gas actuator 30 on derailleur 22. Upshift operating unit 18 also is coupled to shuttle valve 190 through a gas conduit 198. Upshift operating unit 128 receives its supply of gas pressure from a gas conduit 202 that is connected to distribution valve 176. As with upshift operating unit 18, moving air valve control lever 184 away from the home position shown causes gas pressure to be applied to upshift gas actuator 30, and returning air valve control lever 184 to its home position removes gas pressure from upshift gas actuator 30. Thus, each application/removal sequence from either upshift operating unit 18 or upshift operating unit 128 causes derailleur 22 to move chain guide 60 in the upshifting direction by one gear.

Figure 3:
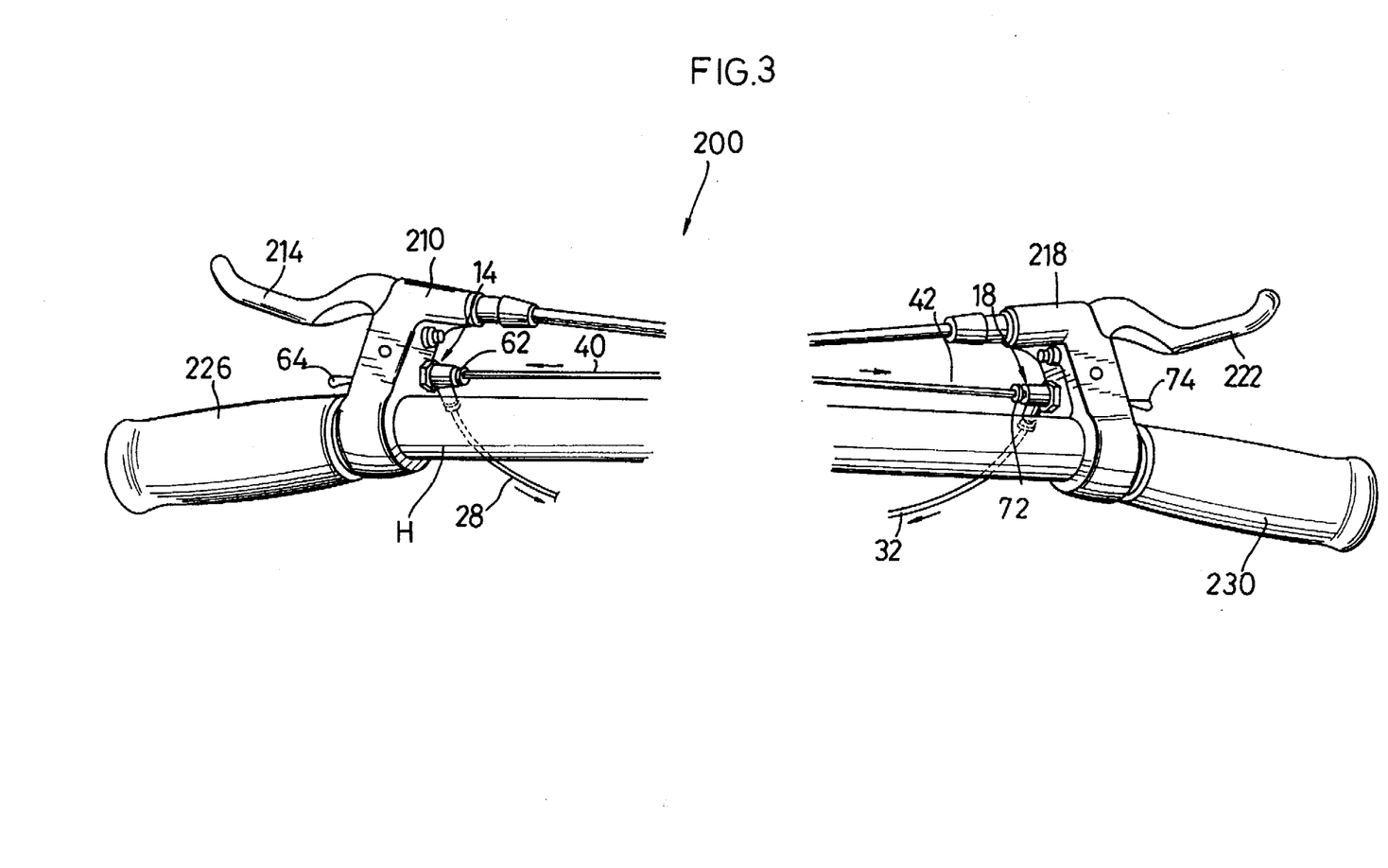
FIG. 3 shows another alternative embodiment of a bicycle shift control device having spaced apart operating units according to the present invention.

FIG. 3 shows another alternative embodiment of a bicycle shift control device 200 having spaced apart operating units according to the present invention. This embodiment is similar to the embodiment shown in FIG. 1, so the same components are numbered identically. In this embodiment, downshift operating unit 14 is mounted to a brake lever mounting bracket 210 which mounts a brake lever 214 to handlebar H, and upshift operating unit 18 is mounted to a brake lever bracket 218 which mounts a brake lever 222 to handlebar H. With this configuration, the rider can operate either brake lever 214 or downshift operating unit 14 while the rider's hand is positioned on a grip 226, and the rider can operate either brake lever 222 or upshift operating unit 18 while the rider's hand is positioned on grip 230.

Figure 4:
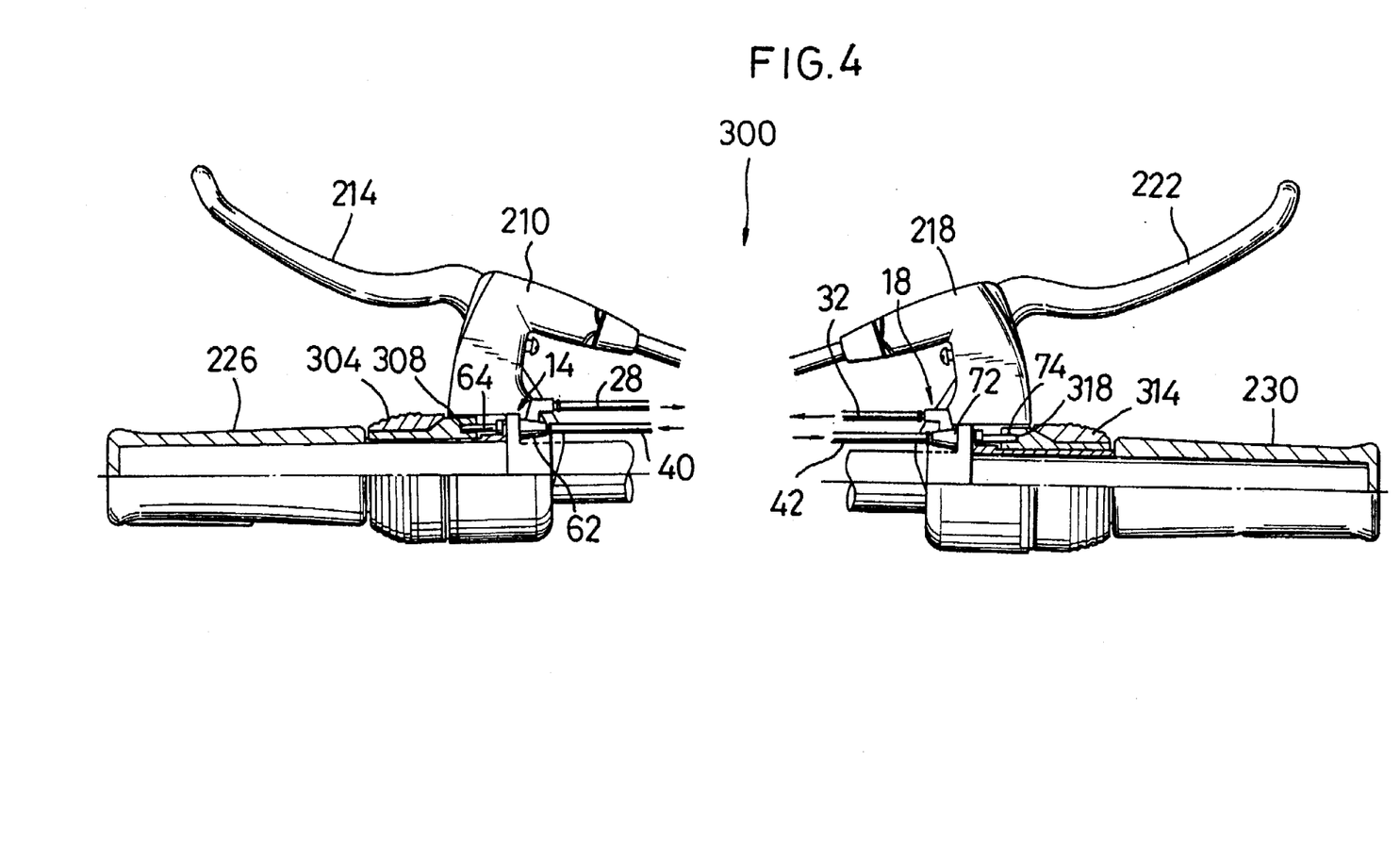
FIG. 4 shows another alternative embodiment of a bicycle shift control device having spaced apart operating units according to the present invention.

FIG. 4 shows another alternative embodiment of a bicycle shift control device 300 having spaced apart operating units according to the present invention. This embodiment is similar to the embodiment shown in FIG. 3, so the same components are numbered identically. In this embodiment, an annular rotatable member 304 is coaxially and rotatably mounted around handlebar H in close proximity to brake lever mounting bracket 210. If desired, rotatable member 304 may be coupled to brake lever bracket 210. Rotatable member 304 includes a bounded opening 308 for receiving air valve control lever 64 therein. Rotation of rotatable member 304 away from its home position moves air valve control lever 64 away from its home position, thus causing air valve 62 to apply compressed gas to downshifting gas actuator 26 in derailleur 22. Returning rotatable member 304 to its home position returns air valve control lever 64 to its home position, thus causing air valve 62 to remove the gas pressure from downshifting gas actuator 26. In other words, downshift operating unit 14 is operated by rotation of rotatable member 304 back and forth.

Similarly, an annular rotatable member 314 is coaxially and rotatably mounted around handlebar H in close proximity to brake lever mounting bracket 218. If desired, rotatable member 314 may be coupled to brake lever bracket 218. Rotatable member 314 includes a bounded opening 318 for receiving air valve control lever 74 therein. Rotation of rotatable member 314 away from its home position moves air valve control lever 74 away from its home position, thus causing air valve 72 to apply compressed gas to upshifting gas actuator 30 in derailleur 22. Returning rotatable member 314 to its home position returns air valve control lever 74 to its home position, thus causing air valve 72 to remove the gas pressure from upshifting gas actuator 30. In other words, upshift operating unit 18 is operated by rotation of rotatable member 314 back and forth.

Figure 5:
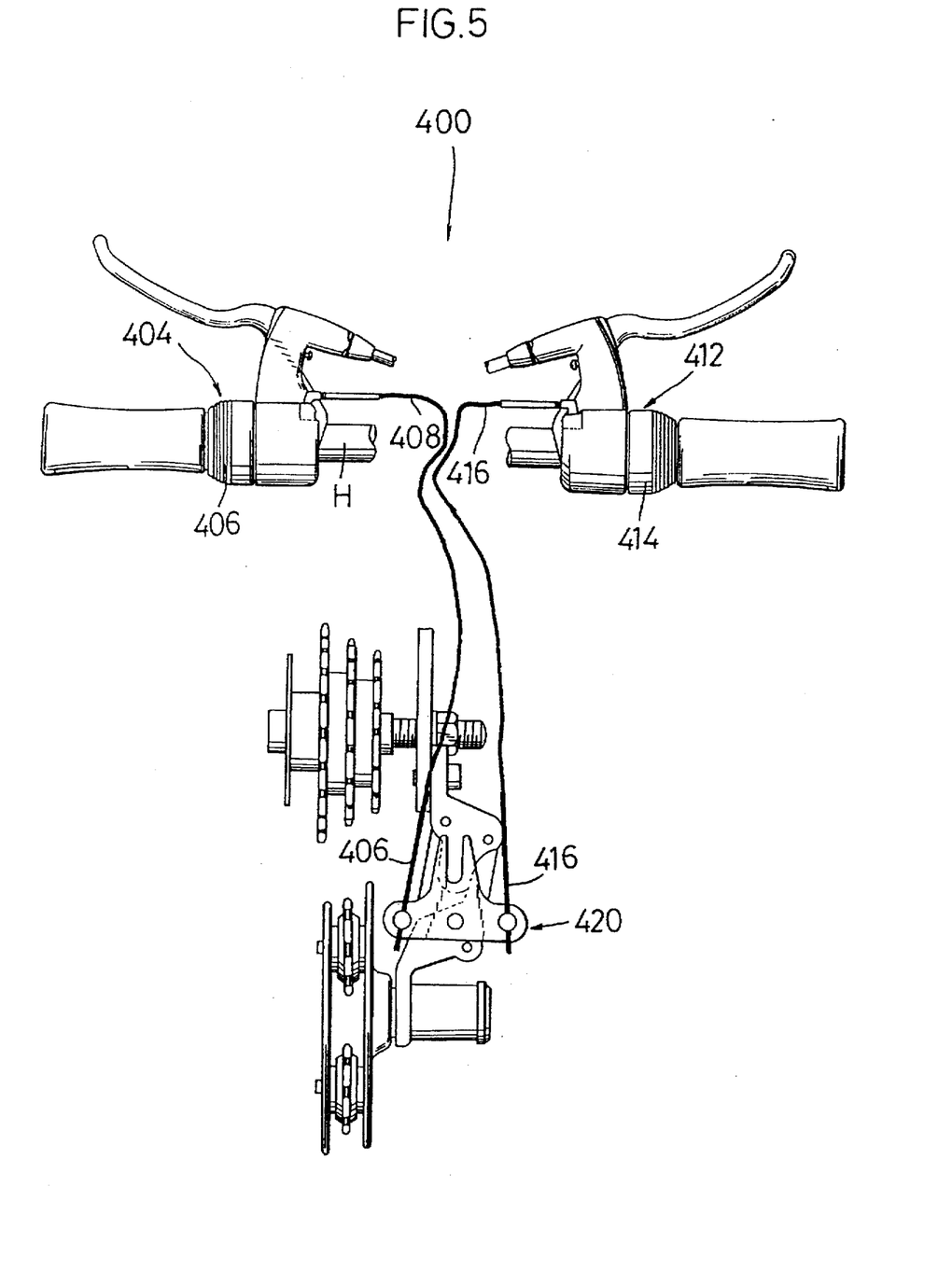
FIG. 5 shows another alternative embodiment of a bicycle shift control device having spaced apart operating units according to the present invention.

FIG. 5 shows another alternative embodiment of a bicycle shift control device 400 having spaced apart operating units according to the present invention. This embodiment differs from the other embodiments in that the system is cable operated. More specifically, bicycle shift control device 400 includes a downshift twist-grip shifting device 404 having a rotatable member 406 coaxially mounted around handlebar H and coupled to a downshift control cable 408, an upshift twist-grip shifting device 412 having a rotatable member 414 coaxially mounted around handlebar H and coupled to an upshift control cable 416, and a derailleur 420 coupled to downshift control cable 408 and to upshift control cable 416. Downshift twist-grip shifting device 404 and upshift twist-grip shifting device 412 may be any number of known twist-grip shifting devices, and each may be constructed in accordance with the teachings of JP 58-26571. Derailleur 420 may be constructed in accordance with the teachings of U.S. Pat. No. 3,453,899. Rotation of rotatable member 406 causes derailleur 420 to move in a downshifting direction, and rotation of rotatable member 414 causes derailleur 420 to move in an upshifting direction.

Figure 6:
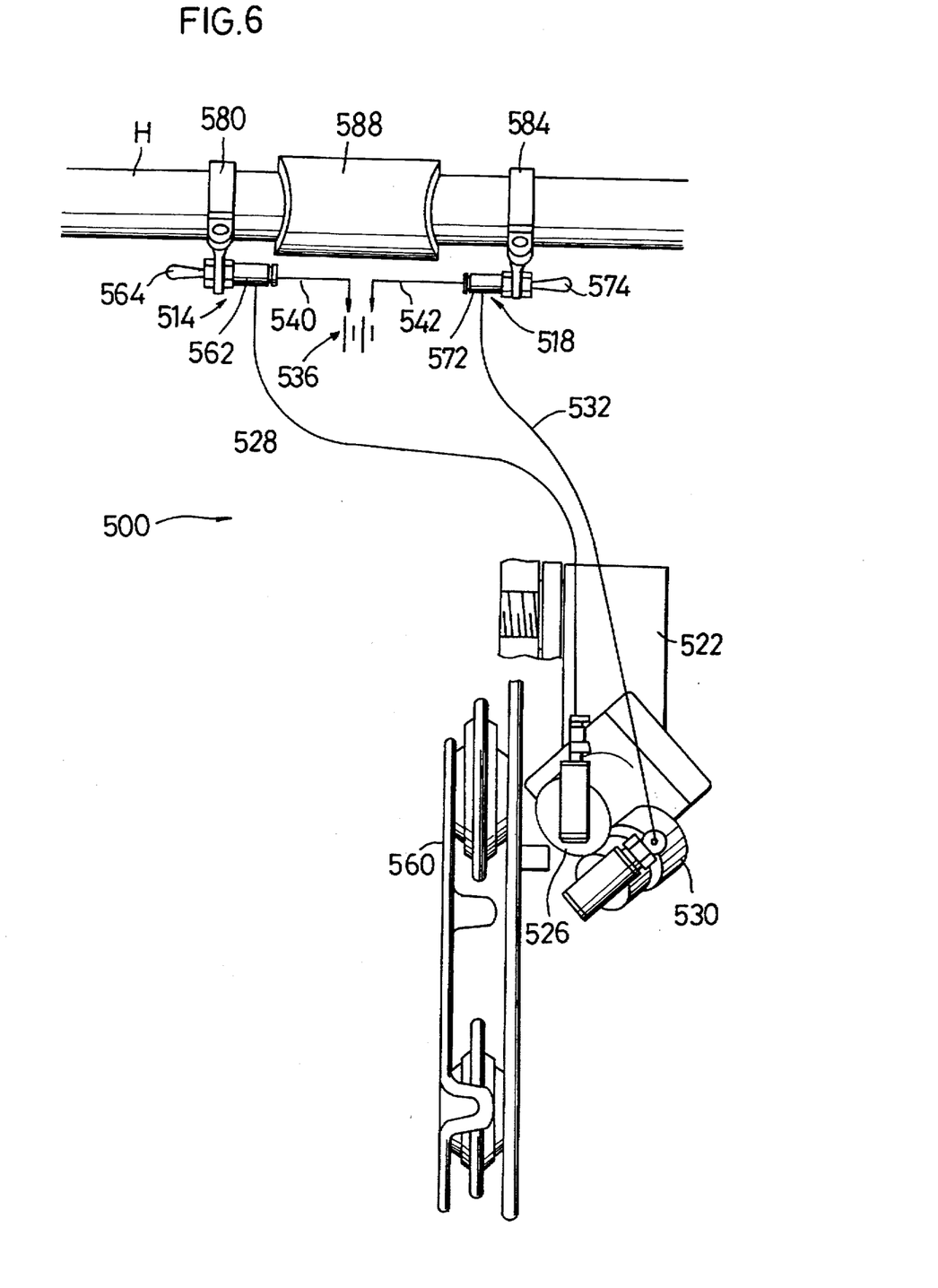
FIG. 6 shows another alternative embodiment of a bicycle shift control device having spaced apart operating units according to the present invention.

FIG. 6 shows another embodiment of a bicycle shift control device 500 having spaced apart operating units 514 and 518 according to the present invention. Operating units 514 and 518 are used to control downshifting and upshifting of an electrically actuated derailleur 522. In this embodiment, operating unit 514 functions as a downshift operating unit, and operating unit 518 functions as an upshift operating unit. Electrically actuated derailleur 522 includes a downshift electrical actuator such as a solenoid 526 and an upshift electrical actuator such as a solenoid 530. Downshift electrical actuator 526 is connected to downshift operating unit 514 through a wire 528, and upshift electrical actuator 530 is connected to upshift operating unit 518 through a wire 532. Downshift operating unit 514 and upshift operating unit 518 are coupled to a power supply such as a battery 536 through wires 540 and 542, respectively. In general, supplying electrical signals to downshift electrical actuator 526 causes derailleur 522 to move a chain guide 560 in a downshifting direction by one gear at a time, and supplying electrical signals to upshift electrical actuator 530 causes derailleur 522 to move chain guide 560 in an upshifting direction by one gear at a time. Electrically actuated derailleur 522 and its associated components may be constructed in accordance with the teachings of my copending patent application entitled "Gas Actuated Derailleur," mentioned above, but with the gas actuators replaced by electrical solenoids.

In this embodiment, downshift operating unit 514 comprises a momentary electrical switch 562 having a switch lever 564 that may be in the form of a toggle switch lever. Moving switch lever 564 away from the home position shown causes an electrical signal to be applied to downshift electrical actuator 526, and returning switch lever 564 to its home position removes the electrical signal from downshift electrical actuator 526. Each application/removal sequence causes derailleur 522 to move chain guide 560 in the downshifting direction by one gear. Similarly, upshift operating unit 518 comprises a momentary electrical switch 572 having a switch lever 574, which also may be in the form of a toggle switch lever. Moving switch lever 574 away from the home position shown causes an electrical signal to be applied to upshift electrical actuator 530, and returning switch lever 574 to its home position removes the electrical signal from upshift electrical actuator 530. Each application/removal sequence causes derailleur 522 to move chain guide 560 in the upshifting direction by one gear.

As shown in FIG. 6, downshift operating unit 514 is mounted to a handlebar H through a mounting bracket 580, and upshift operating unit 518 is mounted to handlebar H through a mounting bracket 584. Handlebar H includes an intermediate handlebar stem mounting portion 588 which is usually located in the center of the handlebar for mounting the handlebar to a handlebar stem (not shown) which, in turn, is mounted to the bicycle front fork (not shown). Thus, this embodiment is substantially the same as the embodiment shown in FIG. 1 but with electrical components rather than gas actuated components.

While the above is a description of various embodiments of the present invention, further modifications may be employed without departing from the spirit and scope of the present invention. For example, the upshift operating unit and downshift operating unit may be placed in any desired position which produces the advantages desired. The electrically operated derailleur shown in FIG. 6 may be configured in the same manner as the embodiments shown in FIGS. 2–4 (with the electrical switches placed accordingly). In all the embodiments, buttons may be used instead of toggle switches. Thus, the scope of the invention should not be limited by the specific structures disclosed. Instead, the true scope of the invention should be determined by the following claims.

What is claimed is:

1. A bicycle shift control device for operating a gas actuated bicycle transmission comprising:

a first downshift control device;

a first upshift control device;

wherein the first downshift control device is spaced apart from the first upshift control device; and wherein the first downshift control device comprises a first downshift air valve having a first downshift air valve control member, a first downshift air valve inlet conduit for supplying pressurized gas to the first downshift air valve and a first downshift air valve outlet conduit for supplying the pressurized gas to the bicycle transmission, and wherein the first upshift control device comprises a first upshift air valve having a first upshift air valve control member, a first upshift air valve inlet conduit for supplying pressurized gas to the first upshift air valve and a first upshift air valve outlet conduit for supplying the pressurized gas to the bicycle transmission.

2. The device according to claim 1 wherein the first downshift air valve control member comprises a first downshift air valve control lever, and wherein the first upshift air valve control member comprises a first upshift air valve control lever.

3. A bicycle shift control device for operating a gas actuated bicycle transmission comprising:
   a first downshift control device;
   a first upshift control device;
   wherein the first downshift control device is spaced apart from the first upshift control device;
   wherein the first downshift control device comprises:
      a downshift air valve having a downshift air valve control member;
      a first downshift air valve inlet conduit for supplying pressurized gas to the first downshift air valve;
      a first downshift air valve outlet conduit for supplying the pressurized gas to the bicycle transmission; and
      a rotatable downshift control member operatively coupled to the downshift air valve so that rotation of the rotatable downshift control member operates the downshift air valve control member; and
   wherein the first upshift control device comprises:
      an upshift air valve having an upshift air valve control member;
      a first upshift air valve inlet conduit for supplying pressurized gas to the first upshift air valve;
      a first upshift air valve outlet conduit for supplying the pressurized gas to the bicycle transmission; and
      a rotatable upshift control member operatively coupled to the upshift air valve so that rotation of the rotatable upshift control member operates the upshift air valve control member.

4. The device according to claim 3 wherein the rotatable downshift control member has an annular shape, and wherein the rotatable upshift control member has an annular shape.

5. The device according to claim 3 wherein the downshift air valve control member comprises a downshift air valve control lever, and wherein the upshift air valve control member comprises an upshift air valve control lever.

6. The device according to claim 5 wherein the rotatable downshift control member has an annular shape, and wherein the rotatable upshift control member has an annular shape.

7. A bicycle shift control device for operating a gas actuated bicycle transmission comprising:
   a first downshift control device;
   a first upshift control device;
   wherein the first downshift control device is spaced apart from the first upshift control device;
   a first brake lever bracket, wherein the first downshift control device is mounted to the first brake lever bracket;
   a second brake lever bracket, wherein the first upshift control device is mounted to the second brake lever bracket;
   wherein the first downshift control device comprises a first downshift air valve having a first downshift air valve control member, a first downshift air valve inlet conduit for supplying pressurized gas to the first downshift air valve and a first downshift air valve outlet conduit for supplying the pressurized gas to the bicycle transmission, and wherein the first upshift control device comprises a first upshift air valve having a first upshift air valve control member, a first upshift air valve inlet conduit for supplying pressurized gas to the first upshift air valve and a first upshift air valve outlet conduit for supplying the pressurized gas to the bicycle transmission.

8. The device according to claim 7 wherein the first downshift air valve control member comprises a first downshift air valve control lever, and wherein the first upshift air valve control member comprises a first upshift air valve control lever.

9. A bicycle shift control device comprising:
   a first downshift control device;
   a first upshift control device;
   wherein the first downshift control device is spaced apart from the first upshift control device;
   a second downshift control device;
   a second upshift control device;
   wherein the second downshift control device is spaced apart from the second upshift control device;
   wherein the first downshift control device comprises a first downshift air valve having a first downshift air valve control member, wherein the first upshift control device comprises a first upshift air valve having a first upshift air valve control member, wherein the second downshift control device comprises a second downshift air valve having a second downshift air valve control member, and wherein the second upshift control device comprises a second upshift air valve having a second upshift air valve control member.

10. The device according to claim 9 wherein the first downshift air valve control member comprises a first downshift air valve control lever, wherein the first upshift air valve control member comprises a first upshift air valve control lever, wherein the second downshift air valve control member comprises a second downshift air valve control lever, and wherein the second upshift air valve control member comprises a second upshift air valve control lever.

11. The device according to claim 10 wherein the first downshift control device is spaced apart from the second downshift control device, and wherein the first upshift control device is spaced apart from the second upshift control device.

12. A bicycle shift control device for operating a gas actuated bicycle transmission comprising:
   a first downshift control device;
   a first upshift control device;
   a handlebar having an intermediate handlebar stem attachment portion;
   wherein the first downshift control device is mounted on one side of the handlebar stem attachment portion;
   wherein the first upshift control device is mounted on an opposite side of the handlebar stem attachment portion;
   wherein the first downshift control device comprises a first downshift air valve having a first downshift air valve control member, a first downshift air valve inlet conduit for supplying pressurized gas to the first downshift air valve and a first downshift air valve outlet conduit for supplying the pressurized gas to the bicycle transmission, and wherein the first upshift control device comprises a first upshift air valve having a first upshift air valve control member, a first upshift air valve inlet conduit for supplying pressurized gas to the first upshift air valve and a first upshift air valve outlet conduit for supplying the pressurized gas to the bicycle transmission.

13. The device according to claim 12 wherein the first downshift air valve control member comprises a first downshift air valve control lever, and wherein the first upshift air valve control member comprises a first upshift air valve control lever.

14. A bicycle shift control device comprising:
a first downshift control device;
a first upshift control device;
a handlebar having an intermediate handlebar stem attachment portion;
wherein the first downshift control device is mounted on one side of the handlebar stem attachment portion;
wherein the first upshift control device is mounted on an opposite side of the handlebar stem attachment portion;
wherein the first downshift control device comprises:
 a downshift air valve having a downshift air valve control member; and
 a rotatable downshift control member coaxially mounted around the handlebar and operatively coupled to the downshift air valve so that rotation of the rotatable downshift control member operates the downshift air valve control member; and
wherein the first upshift control device comprises:
 an upshift air valve having an upshift air valve control member; and
 a rotatable upshift control member coaxially mounted around the handlebar and operatively coupled to the upshift air valve so that rotation of the rotatable upshift control member operates the upshift air valve control member.

15. The device according to claim 14 wherein the downshift air valve control member comprises a downshift air valve control lever, and wherein the upshift air valve control member comprises an upshift air valve control lever.

16. A bicycle shift control device for operating a gas actuated bicycle transmission comprising:
a first downshift control device;
a first upshift control device;
a handlebar having an intermediate handlebar stem attachment portion;
wherein the first downshift control device is mounted on one side of the handlebar stem attachment portion;
wherein the first upshift control device is mounted on an opposite side of the handlebar stem attachment portion;
a first brake lever bracket mounted to the handlebar, wherein the first downshift control device is mounted to the first brake lever bracket;
a second brake lever bracket mounted to the handlebar, wherein the first upshift control device is mounted to the second brake lever bracket;
wherein the first downshift control device comprises a first downshift air valve having a first downshift air valve control member, a first downshift air valve inlet conduit for supplying pressurized gas to the first downshift air valve and a first downshift air valve outlet conduit for supplying the pressurized gas to the bicycle transmission, and wherein the first upshift control device comprises a first upshift air valve having a first upshift air valve control member, a first upshift air valve inlet conduit for supplying pressurized gas to the first upshift air valve and a first upshift air valve outlet conduit for supplying the pressurized gas to the bicycle transmission.

17. The device according to claim 16 wherein the first downshift air valve control member comprises a first downshift air valve control lever, and wherein the first upshift air valve control member comprises a first upshift air valve control lever.

18. A bicycle shift control device comprising:
a first downshift control device;
a first upshift control device;
a handlebar having an intermediate handlebar stem attachment portion, wherein the handlebar includes:
 a first handlebar extension extending from a first end of the handlebar; and
 a second handlebar extension extending from a second end of the handlebar;
wherein the first downshift control device is mounted on one side of the handlebar stem attachment portion;
wherein the first upshift control device is mounted on an opposite side of the handlebar stem attachment portion;
a second downshift control device mounted to the first handlebar extension;
a second upshift control device mounted to the second handlebar extension;
wherein the first downshift control device comprises a first downshift air valve having a first downshift air valve control member, wherein the first upshift control device comprises a first upshift air valve having a first upshift air valve control member, wherein the second downshift control device comprises a second downshift air valve having a second downshift air valve control member, and wherein the second upshift control device comprises a second upshift air valve having a second upshift air valve control member.

19. The shift control device according to claim 18 wherein the first handlebar extension extends generally perpendicular to the first end of the handlebar, and wherein the second handlebar extension extends generally perpendicular to the second end of the handlebar.

20. The device according to claim 18 wherein the first downshift air valve control member comprises a first downshift air valve control lever, wherein the first upshift air valve control member comprises a first upshift air valve control lever, wherein the second downshift air valve control member comprises a second downshift air valve control lever, and wherein the second upshift air valve control member comprises a second upshift air valve control lever.

21. A bicycle shift control device for operating a gas actuated bicycle transmission comprising:
a first downshift control device;
a first upshift control device;
wherein the first downshift control device comprises a first downshift air valve having a first downshift air valve control lever, a first downshift air valve inlet conduit for supplying pressurized gas to the first downshift air valve and a first downshift air valve outlet conduit for supplying the pressurized gas to the bicycle transmission; and wherein the first upshift control device comprises a first upshift air valve having a first upshift air valve control lever, a first upshift air valve inlet conduit for supplying pressurized gas to the first upshift air valve and a first upshift air valve outlet conduit for supplying the pressurized gas to the bicycle transmission.

22. A bicycle shift control device for operating a gas actuated bicycle transmission comprising:

a first downshift control device;

a first upshift control device;

wherein the first downshift control device comprises:
- a downshift air valve having a downshift air valve control member;
- a first downshift air valve inlet conduit for supplying pressurized gas to the first downshift air valve;
- a first downshift air valve outlet conduit for supplying the pressurized gas to the bicycle transmission; and
- a rotatable downshift control member operatively coupled to the downshift air valve so that rotation of the rotatable downshift control member operates the downshift air valve control member; and wherein the first upshift control device comprises:
- an upshift air valve having an upshift air valve control member;
- a first upshift air valve inlet conduit for supplying pressurized gas to the first upshift air valve;
- a first upshift air valve outlet conduit for supplying the pressurized gas to the bicycle transmission; and
- a rotatable upshift control member operatively coupled to the upshift air valve so that rotation of the rotatable upshift control member operates the upshift air valve control member.

23. The device according to claim 22 wherein the rotatable downshift control member has an annular shape, and wherein the rotatable upshift control member has an annular shape.

24. The device according to claim 22 wherein the downshift air valve control member comprises a downshift air valve control lever, and wherein the upshift air valve control member comprises an upshift air valve control lever.

25. The device according to claim 24 wherein the rotatable downshift control member has an annular shape, and wherein the rotatable upshift control member has an annular shape.

* * * * *